(12) United States Patent
Davidson (10) Patent No.: US 9,435,880 B2
(45) Date of Patent: Sep. 6, 2016

(54) PULSE TRANSPONDER COUNTERMEASURE

(71) Applicant: Ron Yaacov Davidson, Zikhron Yaacov (IL)

(72) Inventor: Ron Yaacov Davidson, Zikhron Yaacov (IL)

(*) Notice: Subject to any disclaimer, the term of this patent is extended or adjusted under 35 U.S.C. 154(b) by 167 days.

(21) Appl. No.: 14/352,097

(22) PCT Filed: Nov. 13, 2012

(86) PCT No.: PCT/IB2012/056394
§ 371 (c)(1),
(2) Date: Apr. 16, 2014

(87) PCT Pub. No.: WO2013/072851
PCT Pub. Date: May 23, 2013

(65) Prior Publication Data
US 2014/0240161 A1 Aug. 28, 2014

Related U.S. Application Data

(60) Provisional application No. 61/629,399, filed on Nov. 18, 2011.

(51) Int. Cl.
*G01S 7/495* (2006.01)
*G01S 17/88* (2006.01)
(Continued)

(52) U.S. Cl.
CPC .............. *G01S 7/495* (2013.01); *G01S 7/4806* (2013.01); *G01S 17/58* (2013.01); *G01S 17/88* (2013.01); *H04K 3/00* (2013.01); *H04K 3/60* (2013.01); *H04K 3/80* (2013.01)

(58) Field of Classification Search
CPC ...... G01S 7/48; G01S 7/4804; G01S 7/4806; G01S 7/495; G01S 17/02; G01S 17/50; G01S 17/58; G01S 17/74; G01S 17/88; G01S 17/06; G01S 17/08; G01S 17/10; G01S 7/02; G01S 7/38; G01S 7/40; G01S 17/32; G01S 17/325; G01S 17/46; G01S 17/48; H04K 3/00; H04K 3/40; H04K 3/41; H04K 3/415; H04K 3/60; H04K 3/65; H04K 3/80

USPC .............. 342/13, 14, 42–51, 175, 195, 16; 398/39; 455/1; 356/3, 4.01, 5.01, 27, 356/28

See application file for complete search history.

(56) References Cited

U.S. PATENT DOCUMENTS

| 4,322,730 A | 3/1982 | Chrzanowski |
|---|---|---|
| 5,521,696 A | 5/1996 | Dunne |

(Continued)

FOREIGN PATENT DOCUMENTS

| DE | 2408058 A1 | 8/1975 |
|---|---|---|
| WO | 9721110 A1 | 6/1997 |
| WO | 03034087 A2 | 4/2003 |

OTHER PUBLICATIONS

International Search Report in PCT/IB2012/056394 dated Mar. 21, 2013.
(Continued)

*Primary Examiner* — Bernarr Gregory
(74) *Attorney, Agent, or Firm* — Manelli Selter PLLC; Edward J. Stemberger (57) ABSTRACT

A pulse transponder countermeasure device, comprising: a central processing unit (CPU); an optical receiver adapted to receive detection signals from a speed measuring device; at least one optical transmitter adapted to transmit jamming signals to the speed measuring device; at least one software controlled driver configured to drive the optical transmitter and memory storing a database of measuring devices signature signals and reflective signals, the CPU configured to identify the speed measuring device in its database according to the received detection signal's signature and calculate a response time for sending a jamming signal to the speed measuring device so as to change the speed perceived by the speed measurement device.

21 Claims, 5 Drawing Sheets

(51) Int. Cl.
*H03K 3/00* (2006.01)
*H04K 3/00* (2006.01)
*G01S 17/58* (2006.01)
*G01S 7/48* (2006.01)
*G01S 7/00* (2006.01)
*G01S 17/00* (2006.01)

(56) References Cited

U.S. PATENT DOCUMENTS

| | | | | |
|---|---|---|---|---|
| 5,715,045 A * | 2/1998 | Dunne | G01S 7/495 | 342/16 |
| 5,767,954 A * | 6/1998 | Laakmann | G01S 7/495 | 342/14 |
| 6,031,601 A * | 2/2000 | McCusker | G01S 17/48 | 356/5.01 |
| 6,833,910 B2 | 12/2004 | Bogh-Andersen | | |
| 7,573,564 B2 * | 8/2009 | Ruff | G01S 17/58 | 356/4.01 |
| 7,746,450 B2 * | 6/2010 | Willner | G01S 17/58 | 356/28 |
| 8,605,262 B2 * | 12/2013 | Campbell | G01S 17/325 | 356/4.01 |
| 2011/0001652 A1 * | 1/2011 | Martino | G01S 7/38 | 342/14 |

OTHER PUBLICATIONS

European Search Report in EP 12849640.3 dated Aug. 24, 2015.
International Preliminary Report on Patentability in PCT/IB2012/056394 dated May 20, 2014.

* cited by examiner

PULSE TRANSPONDER COUNTERMEASURE

CROSS-REFERENCE TO RELATED PATENT APPLICATIONS

This patent application claims priority from and is related to U.S. Provisional Patent Application Ser. No. 61/629,399, filed 11.18.2011, this U.S. Provisional Patent Application incorporated by reference in its entirety herein.

TECHNICAL FIELD

The present invention relates to a laser transponder for disabling a laser-based speed monitor, which is transmitting a monitor laser beam at a moving vehicle by transmitting a false reading to the laser-based speed monitor.

BACKGROUND

Pulse transponder measurement devices such as Laser Technology Inc LTI Truspeed are widely used in fields such as radar, lidar, range-finder or distance-meter. However, these measurements can be counter-measured by devices such as Blinder hp-905 and there is a growing need to better identify when a countermeasure is used against the measurement device.

Latest generation measurement devices have a limited ability to detect when a countermeasure is used against them. There is a growing need to eliminate the countermeasure trace, so that the measurement device does not detect that a countermeasure unit is disrupting the measurement device's activity.

U.S. Pat. Nos. 6,833,910, 5,767,954 and 5,793,477 all describe systems for disabling a laser-based speed measuring device. These systems receive a signal from a speed monitor, after which they transmit a high energy signal to disable the speed monitor. However, some speed monitors can detect that the received signal is much higher than their own expected return signal, and conclude that a countermeasure is activated.

SUMMARY

According to a first aspect of the present invention there is provided a pulse transponder countermeasure device, comprising: a central processing unit (CPU); an optical receiver connected with said CPU, said optical receiver adapted to receive detection signals from a speed measuring device; at least one optical transmitter connected with said CPU, said at least one optical transmitter adapted to transmit jamming signals to said speed measuring device; at least one software controlled driver configured to drive said at least one optical transmitter, said at least one driver connected with said CPU; and memory connected with said CPU, said memory storing a database of measuring devices signature signals and reflective signals, said CPU configured to identify said speed measuring device in said database according to said received detection signal's signature and calculate a response time for sending a jamming signal to said speed measuring device so as to change the speed perceived by said speed measurement device.

The CPU may further be configured to quantify said detected signal's dimensions and send a jamming signal that simulates a reflected signal.

The device may additionally comprise a speed sensor unit adapted to calculate said vehicle's speed.

The software controlled driver may be configured to control at least one of said jamming signal's amplitude, width and shape.

The device may additionally comprise an amplifier connected with said optical receiver, said amplifier configured to amplify said detection signals.

According to a second aspect of the present invention there is provided a method of jamming a speed detection signal, comprising: receiving from a speed measurement device a detection signal; calculating a response time for sending a jamming signal to said speed measuring device so as to change the speed perceived by said speed measurement device; and sending a signal toward said speed measurement device at said calculated time.

According to a third aspect of the present invention there is provided a method of jamming a speed detection signal, comprising: receiving from a speed measurement device a detection signal having a signature comprising a reflected signal pattern and range; analyzing said signature to identify said speed measurement device in a database comprising speed measurement devices signatures; calculating a jamming signal that simulates said reflected signal's pattern; and transmitting said jamming signal to said speed measurement device.

The analyzing may comprise using a statistical probability algorithm to find a closest match to said signature in said database.

If the difference between said closest match and said signature is greater than a predefined threshold, a new entry may be created in said database for said signature.

The transmitting a jamming signal may comprise controlling at least one of said jamming signal's amplitude, phase and shape using software control.

The transmitting a jamming signal comprises changing the speed perceived by said measurement device.

The detection signals may comprise a predefined sequence of signals transmitted in a cyclic pattern and wherein said database comprises a complete list of signatures for said cyclic pattern.

The steps of receiving, analyzing, calculating and transmitting may be done simultaneously for at least two speed measurement devices.

The transmitting may comprise: transmitting at least one signal having one dimension similar to said reflected signal and slightly different other dimensions; and transmitting a jamming signal wherein said one dimension is slightly different from said one dimension in said reflected signal.

The one dimension may be selected from the group consisting of: signal amplitude, signal width, signal PRP and signal shape.

The method may additionally comprise adding a database entry for said speed measurement device, comprising said received signal's signature, if said signature is not found in said database.

According to a fourth aspect of the present invention there is provided a pulse transponder measuring device, comprising: a central processing unit (CPU); an optical transmitter connected with said CPU, said optical transmitter adapted to transmit detection signals to a measured vehicle; an optical receiver connected with said CPU, said optical receiver adapted to receive reflected signals from said measured vehicle; at least one software controlled driver configured to drive said optical transmitter, said driver connected with said CPU; and memory connected with said CPU, said memory storing said measuring device's signature signals and expected reflective signals, said CPU configured to detect said measured vehicle's reflected signal, quantify its dimensions, and determine whether the reflected signal is false.

The dimensions may comprise at least one of: signal amplitude, signal width and signal shape.

The determining may comprise comparing said reflective signal's dimension to said stored expected reflective signal's dimensions.

According to a fifth aspect of the present invention there is provided a pulse transponder measuring device, comprising: a central processing unit (CPU); an optical transmitter connected with said CPU, said optical transmitter adapted to transmit detection signals to a measured vehicle; an optical receiver connected with said CPU, said optical receiver adapted to receive reflected signals from said measured vehicle; at least one software controlled driver configured to drive said optical transmitter, said driver connected with said CPU, said CPU configured to generate detection signals having at least one random dimension and to calibrate said driver according to said generated detection signals.

The dimensions may comprise at least one of: signal amplitude, signal width and signal shape.

The CPU may further be configured to: calculate dimensions of an expected reflected signal; compare the dimensions of a received reflected signal to said calculated dimensions; and ignore said received reflected signal if its dimensions are different than said expected dimensions.

According to a sixth aspect of the present invention there is provided a method of measuring a vehicle's speed, comprising: generating at least one first random number; calculating a first detection signal by assigning said at least one first random number to at least one dimension of said calculated first detection signal; calculating the dimensions of a first expected reflected signal; transmitting said calculated first detection signal towards a vehicle; receiving a first signal; calculating said received first signal's dimensions; comparing said calculated received first signal's dimensions with said expected first signal's dimensions; ignoring said received first signal if said comparison indicates that said received first signal is not a reflected signal; if said received first signal is a reflected signal: generating at least one second random number; calculating a second detection signal by assigning said at least one second random number to at least one dimension of said calculated second detection signal; calculating the dimensions of a second expected reflected signal; transmitting said calculated second detection signal towards a vehicle; receiving a second signal; calculating said received second signal's dimensions; comparing said calculated received second signal's dimensions with said expected second signal's dimensions; ignoring said received second signal if said comparison indicates that said received second signal is not a reflected signal; and if said received first signal is a reflected signal, calculating said vehicle's speed by comparing arrival time of said first and second reflected signals.

BRIEF DESCRIPTION OF THE DRAWINGS

For a better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

A first aspect of the present invention is to provide a new and improved pulse transponder countermeasure, and a method for returning a false reading to a measuring device, so that the measuring device does not detect that a false reading was sent or a countermeasure was activated.

The transponder countermeasure causes the speed/distance measurement to display a false reading that can be configured to transmit signals that simulate different styles of speed, for example a constant speed, an ascending speed, a descending speed or a randomly changing ascending and descending speed, or different distance from the measurement device, for example a shorter or longer distance.

Any pulse signal can be categorized by four characteristics. These characteristics will be referred to as the signal dimensions. The dimensions include: the height, which represents the signal amplitude strength; the width, which represents the signal phase duration; the pulse repetition period (PRP) representing the frequency of pulses; and the shape of the pulse, which represents the function (e.g. pulse waves, square waves, boxcar functions, rectangular functions, Nyquist and Gaussian).

The countermeasure transponder of the present invention will now be described in conjunction with FIG. 1.

The countermeasure transponder 110 comprises a Central processing Unit (CPU) or DSP 155, connected to various peripherals comprising an optional amplifier 142, such as available from http://www.analog.com/en/index.html, an optical receiver 140, such as, for example, Si Reach-Through APD, available from Laser Components (www.lasercomponents.com), having a wide wavelength range of e.g. 400-1100 nm, or Si APD with a wavelength range of 880-930 nm, for receiving measuring pulses emitted by the measuring device 100 and amplified by amplifier 142, or a photo detector, such as provided by www.vishay.com and at least one optical transmitter or transponders (145, 150), such as, for example, Pulse Laser Diode, available from Laser Components, for transmitting jamming signals to the measuring device 100. Each transmitter (145, 150) may optionally comprise a diverging lens 147 to increase the probability of the jamming signal hitting the target measuring device the location of which is unknown.

To determine a jamming signal most measuring devices examine the expected time window of the return signal, so that return signals detected out of the time-window of the expected return signal are identified as a jamming signal. Within the expected time window, the measuring device may be programmed to identify the strongest received signal or the weakest received signal as the reflected signal it expects.

According to embodiments of the present invention, the countermeasure transponder identifies the measuring device by its signal signature and transmits a jamming signal within the expected time window. The jamming signal is sent so as to change the vehicle speed perceived by the measuring device, as will be explained in detail below. The jamming signal will be stronger or weaker than the expected reflected signal according to the data in the database entry for the identified measurement device.

Measuring devices can be made to recognize the common patterns of their own reflective signals known as signatures. The measuring device has a minimum and maximum range for the reflected signals, and signals that exceed the common pattern ranges may be identified as jamming attempts.

To overcome these measuring device's jammer detection capabilities, the countermeasure transponder must replicate the measuring device's signature. For this purpose, the countermeasure transponder 110 may have a database 165 of known measuring devices and their signatures. The signature includes a range of common signals and their reflection pattern. The countermeasure transponder detects the measuring device's signal, quantifies its dimensions, and sends a jamming signal that simulates the reflected signal and is within that range.

According to embodiments of the present invention, the countermeasure transponder 110 can also simulate a reflective signal of a measuring device that is not in its database. The countermeasure transponder detects the signal and compares it to other signatures in the database, using known statistical probability algorithms such as Bayesian networks, support vector machines or clustering. The countermeasure transponder calculates a simulated reflective signal that is the average of other similar signatures in its database.

According to embodiments of the present invention, the countermeasure transponder comprises software controlled drivers (156, 157) of the optical transmitter(s) or transponder(s) (145, 150), such as IXYS COLORADO MODEL PCO 7120 http://ixapps.ixys.com/DataSheet/pco-7120_data_sheet.pdf, to generate a jamming signal that simulates a reflected signal. The software controlled driver (156, 157) can control the dimensions of the jamming signal, namely, the amplitude, phase and shape of the signal.

According to embodiments of the present invention, the countermeasure transponder comprises a speed sensor unit 163, such as, for example, a GPS based sensor such as, http://www.racelogic.co.uk/_downloads/vbox/Manuals/Speed_Sensors/RLVB10SPS_Manual.pdf, or a vehicle magnetic based speed sensor (aka a speedometer) such as http://www.spectecsensors.com/html_pages/digital_magnetic_sensor.htm, to measure the self-speed of the vehicle in which the countermeasure transponder is installed. The self-speed measurement is used to calculate the dimensions of the jamming signal, such as to control the PRP between the detection signal and the jamming signals. The calculation is described below. The PRP impacts the speed that the measuring device will identify as the vehicle speed. In other words, controlling the PRP determines the perceived vehicle speed.

According to embodiments of the present invention, the countermeasure transponder is capable of identifying and jamming the measuring device by its signature. The signature is the set of parameters that describe the common dimensions of the detection signal of the measuring device. The common dimensions are recorded in the database 165 per measuring device type. The common dimensions represent the standard deviation, averages, mean averages and min/max values of the dimensions. The countermeasure transponder analyzes the detection signal and compares it to the common dimension parameters using statistical algorithms, to calculate the probability of a match. A probability candidate threshold is set, for example at 30%. The highest scoring match is compared to the second highest match. If the probability difference is less than the threshold, then the second match is added to the candidate match list; the second highest scoring match is compared to the third highest match. If the probability difference is greater than the threshold, then the second match is the last match added to the candidate match list. The example can also be described as $P(n)-P(n+1)<T(30\%)$.

The countermeasure waits for the second pulse signal. This adds the frequency parameter to analyze and compares it to the common dimension signature parameters. The added parameter greatly improves the probability of identification. This step is repeated for the consecutive detection signals.

A positive match is made when the positive match probability is above a set threshold, for example 90%. A positive match can be achieved if the positive threshold is reached and/or if the candidate match list has only 1 candidate. A positive match can happen in the first signal detection or in a consecutive signal. The absolute majority of measures will be identified as match in the first 2-3 signals. If no positive match is found, the signature is added to the database.

According to an embodiment of the present invention, the countermeasure transponder is capable of identifying and jamming a measuring device that is not in the database, by learning its pattern of behavior and signature of signals, and adding these to the database. The countermeasure transponder records the detection signal and identifies the pattern and category of measure. Categories include, for example, a repetitive signal dimension and PRP, or a recurring sequence of dynamically changing signals and/or PRP according to a preconfigured sequence of signal permutations, and/or a randomly changing signal dimension and PRP. The system identifies the measuring device's category, and sends a jamming sequence that is designed for that category. If the countermeasure transponder identifies repetitive signals or recurring sequences signals, it can prepare the n+1 jamming sequence to change the measure's reading of vehicle speed, simulating the signal dimensions and PRP, as described below.

According to embodiments of the present invention, the countermeasure transponder is capable of identifying and jamming a finite sequence of measure signals. Finite sequence measuring devices have a fixed set of signals that change their dimension in each signal of the sequence according to a predefined set of changes. For example, there may be (n) changes of signal dimensions, and after the (n) dimension change elapses, the cycle of signals repeats starting at the $1^{st}$ change. The countermeasure transponder's database 165 may include the complete list of (n) changes. During the countermeasure work-cycle, the countermeasure transponder records the array of received detection signals from a measuring device, and compares the array to the list of stored possible changes. The first recorded measure signal (x) is compared to all (n) possible dimension changes in the countermeasure database, until a matching signal (y) is found; if the measure signal has multiple identical instances (x) in the sequence, there may be several (y) signals found in the countermeasure database; this filters a first set of possibilities for change (x+1). After signal (x+1) is received, the list of possibilities is shortened further; the algorithm filters the list of measure matches to those that match the 2 signals (x, x+1) to 2 signature signals (y, y+1) in the countermeasure database. The step is repeated (e.g. x+2, x+3, etc. . . . ) until the countermeasure has a definite match for the next signal.

According to embodiments of the present invention, the countermeasure transponder is capable of identifying and jamming multiple measuring devices at the same time. The countermeasure transponder can continue to analyze consecutive signals to validate these are of the same measuring device detected in the previous signals. If these are of a different signature, the countermeasure can send simulated signals to more than one measuring device at the same time, using the plurality of optical transmitters.

According to embodiments of the present invention, the countermeasure transponder is capable of identifying and jamming measuring devices that are programmed to identify and ignore jamming signals. Such a measuring device can identify jamming signals that do not exhibit the dimensions of its own common reflection signals. The countermeasure transponder has a simulation module 164 that is intended to simulate the common reflection signal of each measuring device. The simulation module 164 uses the database 165 of measure types and their common reflection signals, called signatures. The database 165 also includes the recommended jamming approach for each measuring device type.

According to embodiments of the present invention, the countermeasure transponder is capable of identifying and jamming measuring devices that are programmed to identify and ignore jamming signals that are of varying amplitude, for example a higher or lower amplitude. The countermeasure transponder will transmit a jamming sequence that confuses the measuring device into identifying the jamming signal as the true signal, by disabling the measuring device's ability to identify the reflected signal. For example, the countermeasure transponder sends a so-called decoy signal, such as a set of ghost signals in the same amplitude as the reflected signal, but with slightly different other dimensions, for example, a set of signals with different PRPs that exhibit a set of different ghost speeds/distances. The measuring device is unable to distinguish which of the set of ghost signals is the true signal. The countermeasure transponder also sends a so-called jamming-signal with a slightly different amplitude. The measuring device translates the set of signals with the same amplitude as reflections from the road, and the single different signal as the true signal.

According to embodiments of the present invention, the countermeasure transponder is capable of identifying and jamming measuring devices that are programmed to identify and ignore jamming signals that have PRP durations different from that expected from a return signal, for example a higher or lower PRP duration. After the countermeasure transponder identifies the measuring device type, the measuring device's sequence and next detection signal PRP is known. The countermeasure transponder prepares the next jamming signal PRP to simulate the detection signal PRP.

According to embodiments of the present invention, the countermeasure transponder is capable of identifying and jamming measuring devices that are programmed to identify and ignore jamming signals that have a phase different from that expected from the return signal, for example shorter or wider phase duration. After the countermeasure transponder identifies the measuring device's type, the measuring device's sequence and next detection signal phase is known. The countermeasure transponder prepares the next jamming signal phase to simulate the detection signal phase.

According to embodiments of the present invention, the countermeasure transponder is capable of identifying and jamming measuring devices that are programmed to identify and ignore jamming signals that have a different shape than that expected from a return signal. The measuring device sends a detection signal of a certain shape, but the reflected signal often has a slightly different shape than the original signal. For example, the measuring device sends a rectangular signal. The expected reflected signal will resemble the general rectangle amplitude and phase, but its corners may be rounded, and its edges may slant off the accurate right angle. The measuring device expects a signal shape that is not a perfect rectangle. The countermeasure transponder will transmit a jamming sequence that confuses the measuring device into identifying the jamming signal as the true signal, by disabling the measuring device's ability to identify the reflective signal. For example, the countermeasure sends a so-called decoy-signal such as a rectangular signal to overlap the reflected signal with a mask signal and present it as a reflected rectangular signal. The measuring device will identify the reflected signal to be a rouge signal and ignore it. The countermeasure will also send a so-called jamming-signal that simulates the expected signal shape. The shape of the signal is generated using the driver 156. Other options for overlapping the reflected signal with a false mask signal can manipulate the other dimensions of the signal to cause the measuring device to ignore them.

As another example, the countermeasure transponder sends a so-called decoy-signal such as a set of signals in the same shape as the reflected signal, but with a slightly different other dimensions, which exhibit a set of different ghost speeds/distances. The measuring device is unable to distinguish which of the set of ghost signals is the true signal. The countermeasure also sends a so-called jamming-signal with slightly different parameters, e.g. higher amplitude. The measuring device translates the set of ghost signals with the same amplitude as reflections from the road, and the single different signal as the true signal. A similar but inverse approach is performed for jamming measuring devices that are programmed to identify and ignore jamming signals that are of lower amplitude.

According to embodiments of the present invention, the countermeasure transponder is capable of sending the masking signal with different start times, compared to the true return signal. The measuring device will not be able to determine the vehicle speed by measuring the distance of the masked signal, because the masked signal is sent at different start times compared to the true return signal.

The various types of measuring devices confusion including masking and sending a set of ghost signals can be used in conjunction to confuse the measuring device. For each measuring device's type, the best method of confusion is recorded in the database.

According to embodiments of the present invention, the countermeasure transponder is capable of identifying and jamming measuring devices by using a combination of jamming techniques, such as simulating the signal amplitude and/or phase duration and/or shape and/or PRP.]

Figure 2A:
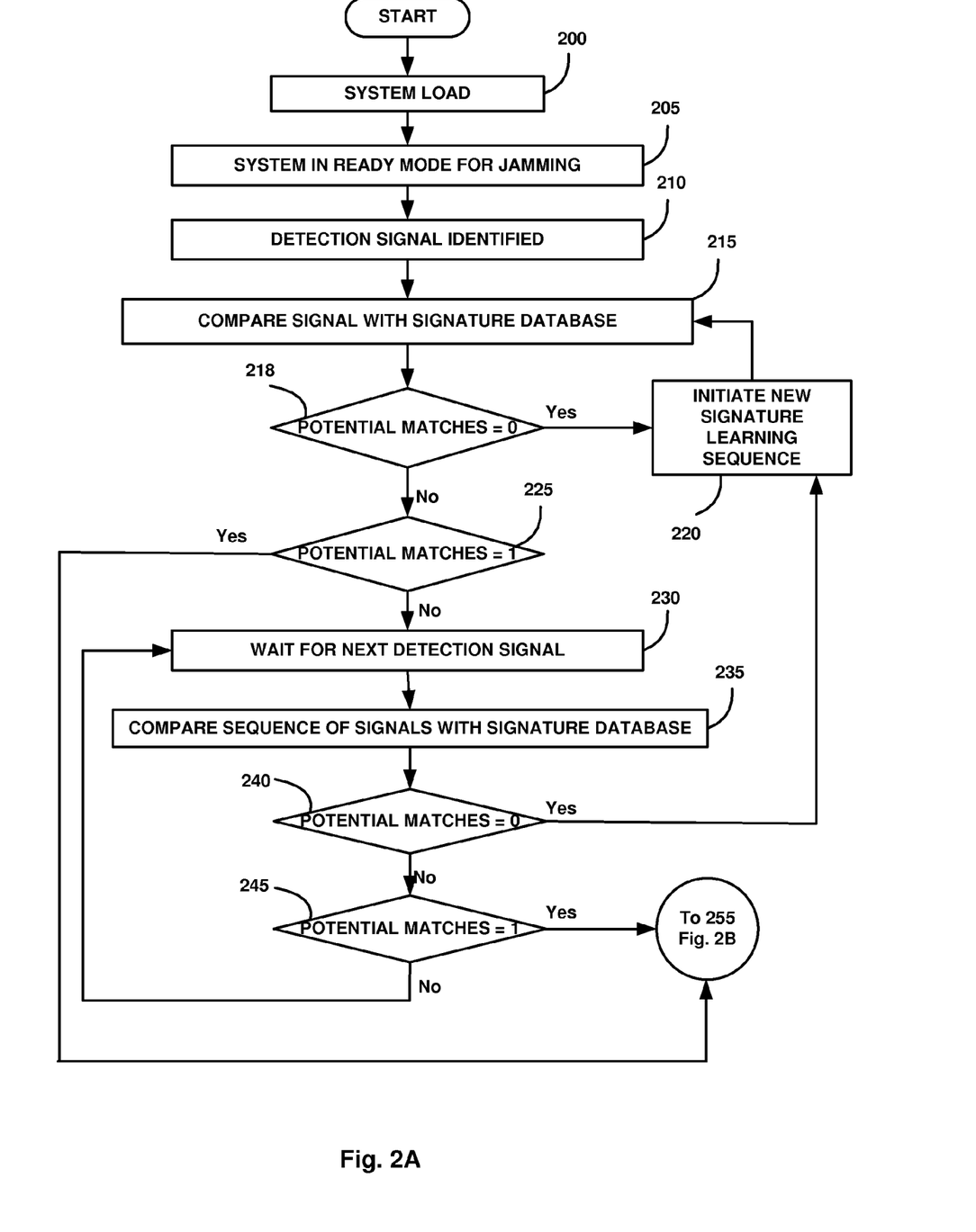
FIGS. 2A and 2B are a flowchart detailing the various steps taken by the countermeasure program to perform the jamming operation.
Figure 2B:
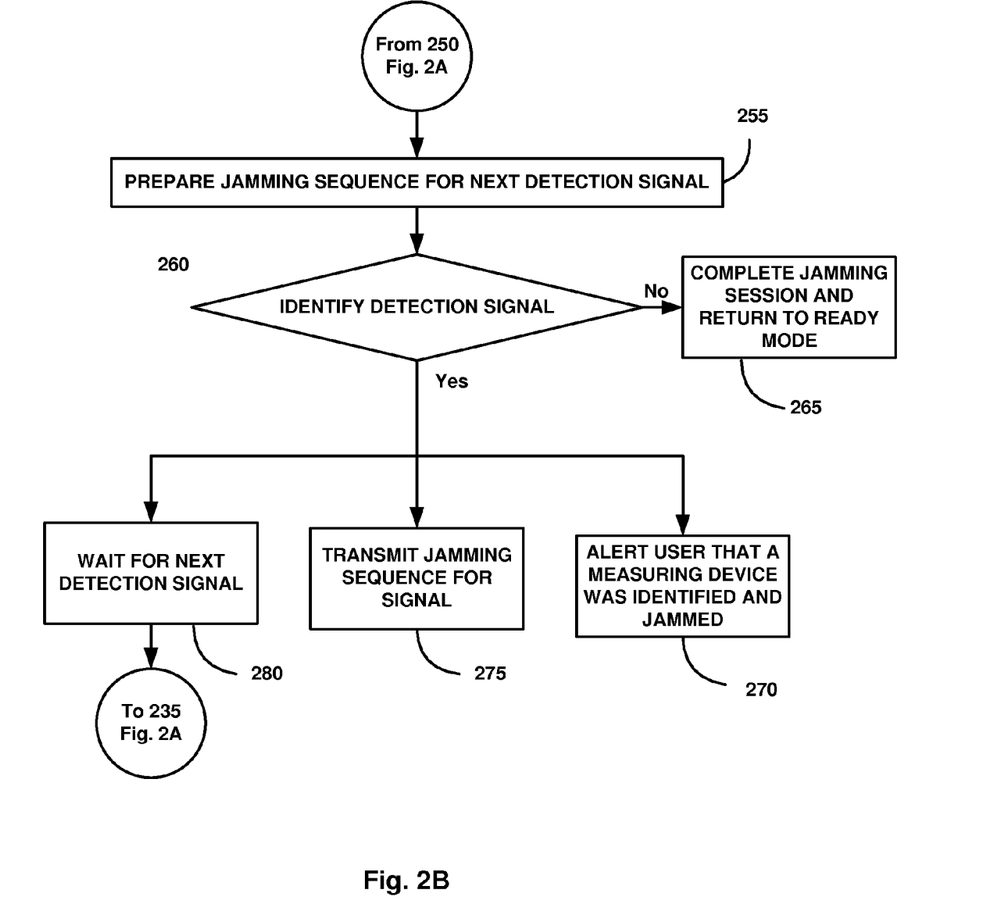

FIGS. 2A and 2B are a flowchart detailing the various steps taken by the countermeasure program to perform the jamming operation.

In step 200 the system is loaded and in step 205 the system is in ready mode for jamming and waits for a detection signal. In step 210 a detection signal has been identified and in step 215 the system compares the signature of the detected signal with the signatures stored in database 165, to detect a match or potential statistical matches, as described above.

If no match or potential match is found (step 218), the system initiates a learning sequence for the new signature (step 220) and adds it to the database 165. If more than one potential match has been found (step 225), the system proceeds to step 230 to wait for the next signal, in order to reduce the number of potential matches. In step 235, after the next signal has been detected, the system compares the sequence of signals with the signature database 165. If no match or potential match is found (step 240), the system initiates a learning sequence for the new signature (step 220) and adds it to the database 165. If more than one potential match has been found (step 245), the system returns to step 230 to wait for the next signal, in order to reduce the number of potential matches.

If a single positive match is found in steps 225 or in step 245, the system proceeds in step 255 (FIG. 2B) to prepare the jamming system for the next detection signal, as described below. In step 260 the system waits for the next detection signal, for which a jamming sequence has been prepared. If no signal is detected, the jamming session is completed (step 265) and the system returns to ready mode (step 205) to wait for further detection signals.

If in step 260 a detection signal is identified, the system proceeds to transmit the prepared jamming sequence for this signal (step 275), an alert is sent to the user to inform him of the identification and jamming of a measuring device (step 270) and the system goes back to step 235 (FIG. 2A) to wait for the next detection signal (step 280).

In order to be able to send the signals in the right time, the transmitting sequence must take into consideration various system delays such as:

a. Receiving delay both receiver and amplifier have rise-up time.
b. Transmitting delay—The laser diode has a rise-up time and the driver has a rise-up time, a fall-down time and a trigger-delay time.
c. Digital delay DSP/Processor delay.

The countermeasure transponder needs to send the decoy-signal and the jamming-signal in sequence, and the time delay between the two transmissions should be small. However, the countermeasure transponder has a setup time before a signal can be sent. The setup time needs to be shorter than the time delay between the two transmissions. To overcome this obstacle, the countermeasure transponder may use two or more sets of transmission components such as a driver, a transmitter and a lens. Alternatively, it may also be possible to use a high-speed driver component such as IXYS COLORADO MODEL PCO 7120 http://ixapps.ixys.com/DataSheet/pco-7120_data_sheet.pdf and its voltage supply such as 1/4C24-P250 http://www.ultravolt.com/uv_docs/HPCDS.pdf, that can change its setup between the decoy-signal and jamming-signal and potentially vice-versa, with negligible rise-up time, fall-down time and trigger-delay time.

Figure 3:
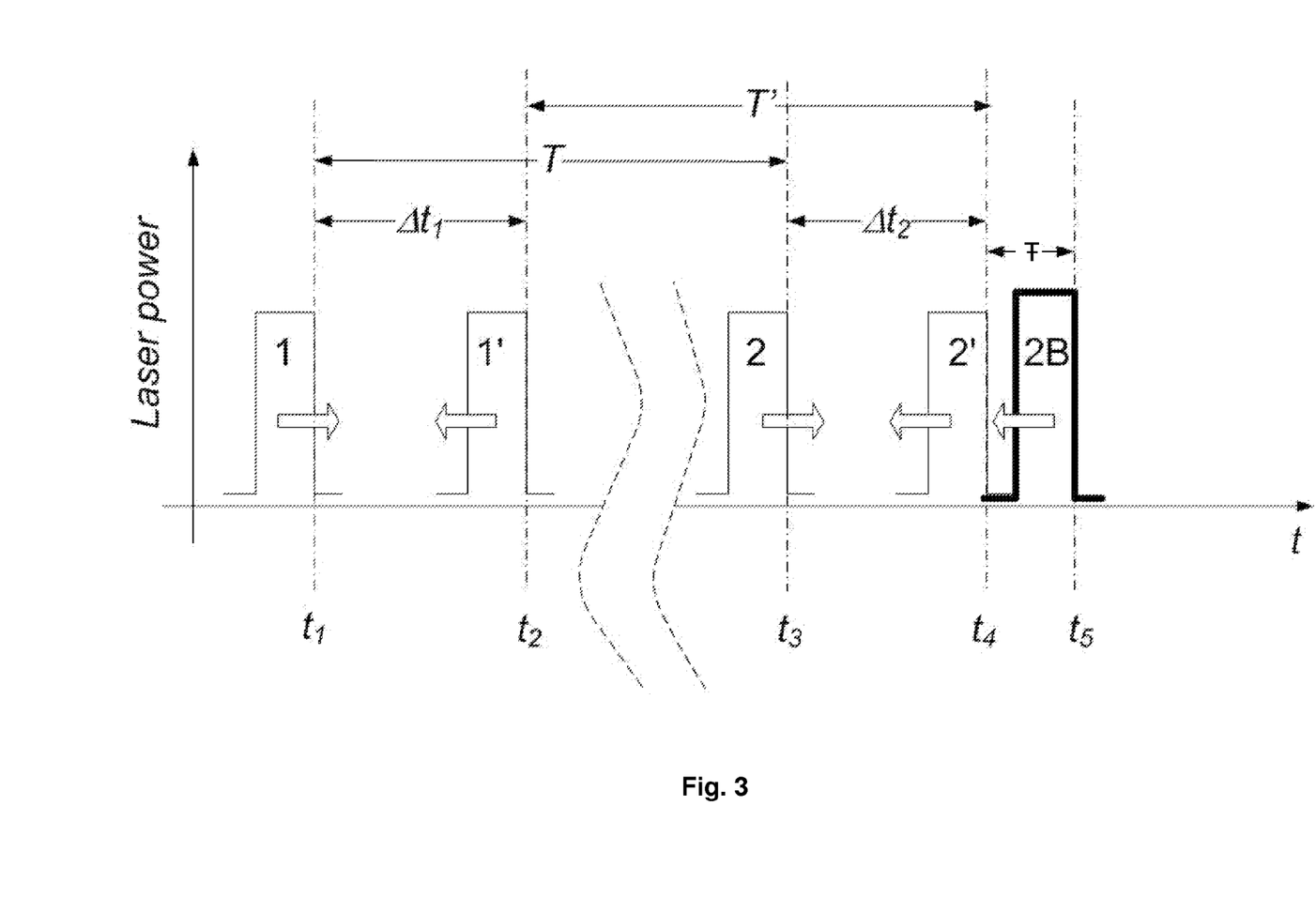
FIG. 3 is a chart depicting time-related behavior of the system according to the present invention.

Calculations:

The various calculations made by the CPU will now be explained in conjunction with FIG. 3.

The measuring device emits a pulse 1 at time $t_1$ and receives the reflected signal 1' at time $t_2$. The time difference between the emitted pulse and the reflected pulse is denoted as $\Delta t_1$.

After a time lapse T, the measuring device emits pulse 2 at time $t_3$ and receives the reflected signal 2' at time $t_4$. The time difference between the second emitted pulse and the second reflected pulse is denoted as $\Delta t_2$.

T' is the time lapse between the arrival of the reflected pulses 1' and 2' to the measuring device. T' is shorter than T due to Doppler shift (The data refers to an approaching vehicle. In principle there is no difference in developing the formulas, but we will differentiate between an approaching vehicle and a vehicle driving away to avoid confusion).

Finally, the countermeasure transponder sends pulse 2B, which should be received by the measuring device at time $t_5$, namely after 2'.

The time difference $\Delta t_1$ enables to establish the distance $L_1$ between the measuring device and the vehicle at the time of the $1^{st}$ pulse $t_1$. The time difference $\Delta t_2$ enables to establish the distance $L_2$ between the measuring device and the vehicle at the time of the $2^{nd}$ pulse $t_2$. The distance is getting shorter since the vehicle is approaching the measuring device:

$$L_1 = c\Delta t_1/2$$

$$L_2 = c\Delta t_2/2$$

where c is the speed of propagation of the pulse. For laser pulses c corresponds to the speed of light. Here, for exemplary, the approximate value of speed of light is taken as $3*10^8$ meter/second.

The measuring device calculates the vehicle's speed v using the distance difference and the time difference:

$$v = (L_1-L_2)/T' = c(\Delta t_1 - \Delta t_2)/2T'$$

$$v = c(t_2-t_1-(t_4-t_3))/2T' = c(t_2-t_1-t_4+t_3)/2T'$$

Now suppose the measuring device records the arrival of the second pulse emitted at a time t4 with a time delay which will be denoted by $\mathcal{T}$. Namely, the arrival of the second pulse is registered at a delayed time $t4+\mathcal{T}$ rather than t4.

We next calculate the fictitious speed U calculated by the measuring device upon receipt of pulse 2B:

$$U = c(t_2-t_1+t_3-t_4-\mathcal{T})/2(T'+\mathcal{T})$$

$$U = (c(t_2-t_1+t_3-t_4)-c\mathcal{T})/2(T'+\mathcal{T}) = c(t_2-t_1+t_3-t_4)/2(T'+\mathcal{T}) - c\mathcal{T}/2(T'+\mathcal{T})$$

$$U = vT'/(T'+\mathcal{T}) - c\mathcal{T}/(T'+\mathcal{T})$$

Before continuing, let us look at the fictitious speed formula U. U comprises two components; the first component $vT'/(T'+\mathcal{T})$ means that the speed U has been reduced as compared to the vehicle's speed v, by the relation between the times $T'/(T'+\mathcal{T})$. Namely, the vehicle has travelled an additional distance in the time $\mathcal{T}$ but the speed has been reduced, although actually the pulse 2B took additional time to arrive at the measurement device, since it was emitted at time $\mathcal{T}$ later.

We will now make a careful assumption to be explained by the following example. T is the actual time between the pulses emitted by the measuring device. If the distance between the vehicle and the measuring device is 300 m, the roundtrip time of pulse 2 is 2 μs. If the distance is 150 m, the roundtrip time of the pulse is 1 μs. Namely, the time between pulses has got to be longer, for example by a factor of 10, or at least 10 μs. The time between pulses is the inverse of the pulses frequency 1/f, so that 10 μs=50 KHz.

As an example, let us assume that the vehicle's speed is 180 Km/h (50 m/s) and we wish to disguise it as 90 Km/h (25 m/s).

As an example, let us also assume that the measurement device operates at a frequency of 1000 Hz. therefore, T is 1 ms.

The measurement device identifies the vehicle at a first distance of 150 m. The $1^{st}$ pulse is emitted at time t1 and after 1 μs the reflected pulse is received $$\Delta t_1 = 2L/c = 300/3*10^8 = 1*10^{-6}$$

A second pulse is sent T ms after the first pulse. Since the vehicle's actual speed (50 m/s) is known to us, we can calculate the difference in the time lapses:

$$v=(L_1-L_2)/T'=c(\Delta t_1-\Delta t_2)/2T'$$

$$v=c(\Delta t_1-\Delta t_2)/2T' \rightarrow 50=((3*10^8)(1*10^{-6}-\Delta t_2)/(2*10^{-3}))$$

$$\Delta t_2=(1-3.34*10^{-4})=0.999666 \text{ µs}$$

The difference in the arrival time of the pulse is very small: 0.999666 µs instead of 1 µs.

In order to fabricate a speed of 25 m/s we calculate $\Delta t_2$:

$$25=(3*10^8/2*10^{-3})(1*10^{-6}-\Delta t_2)$$

$$\Delta t_2=0.99989 \text{ µs}$$

The difference between 0.999666 µs and 0.99989 µs is very small, hence ∓ is very small.

Let us return to the formula $$U=vT'/(T'+\mp)-c\mp/2(T'+\mp)$$

The first member $vT'/(T'+\mp)$ can be approximated by v: $vT'/(T'+\mp) \approx v$
The second member may also be approximated: $c\mp/2(T'+\mp) \approx c/2T$
Therefore: $U \approx v-c/2T \rightarrow (c/2T)=(v-U)$
Although ∓ is very small due to the high speed of light, the second member will contribute to the perceived speed change.

$$\mp =(2T/c)(v-U)$$

It is seen that for an approaching vehicle a delay in the arrival of the second pulse, namely a positive ∓ added to t4 has the effect of reducing the speed of the vehicle as reported by the measuring device in comparison with the actual vehicle speed. However, for a vehicle driving away from the measuring device a pulse which is received earlier will result in reduced vehicle speed as reported by the measuring device compared to the actual vehicle speed.

Summarizing the above, change in the arrival time of the second pulse by interval $$t'_4=t_4 \pm \mp$$

will change the calculated speed U as reported by the measuring device, compared to the actual vehicle speed v:

$$U=v-c\mp/2T$$

where T is the time interval between the emission of the first and the second pulse.
To achieve a reduced speed U<v, ∓ has to be added for an approaching vehicle and subtracted for a vehicle driving away.

EXAMPLE

Approaching vehicle; v=50 m/s; U=25 m/s; T=$10^{-3}$ $$\mp =(2T/c)(v-U)$$

$$\mp =((2*10^{-3})/(3*10^8))*25=1.67^{-10} \text{ sec}$$

A second aspect of the invention is to provide improvements to existing measuring devices, in order to overcome at least some of the countermeasure techniques described above.

Figure 1:
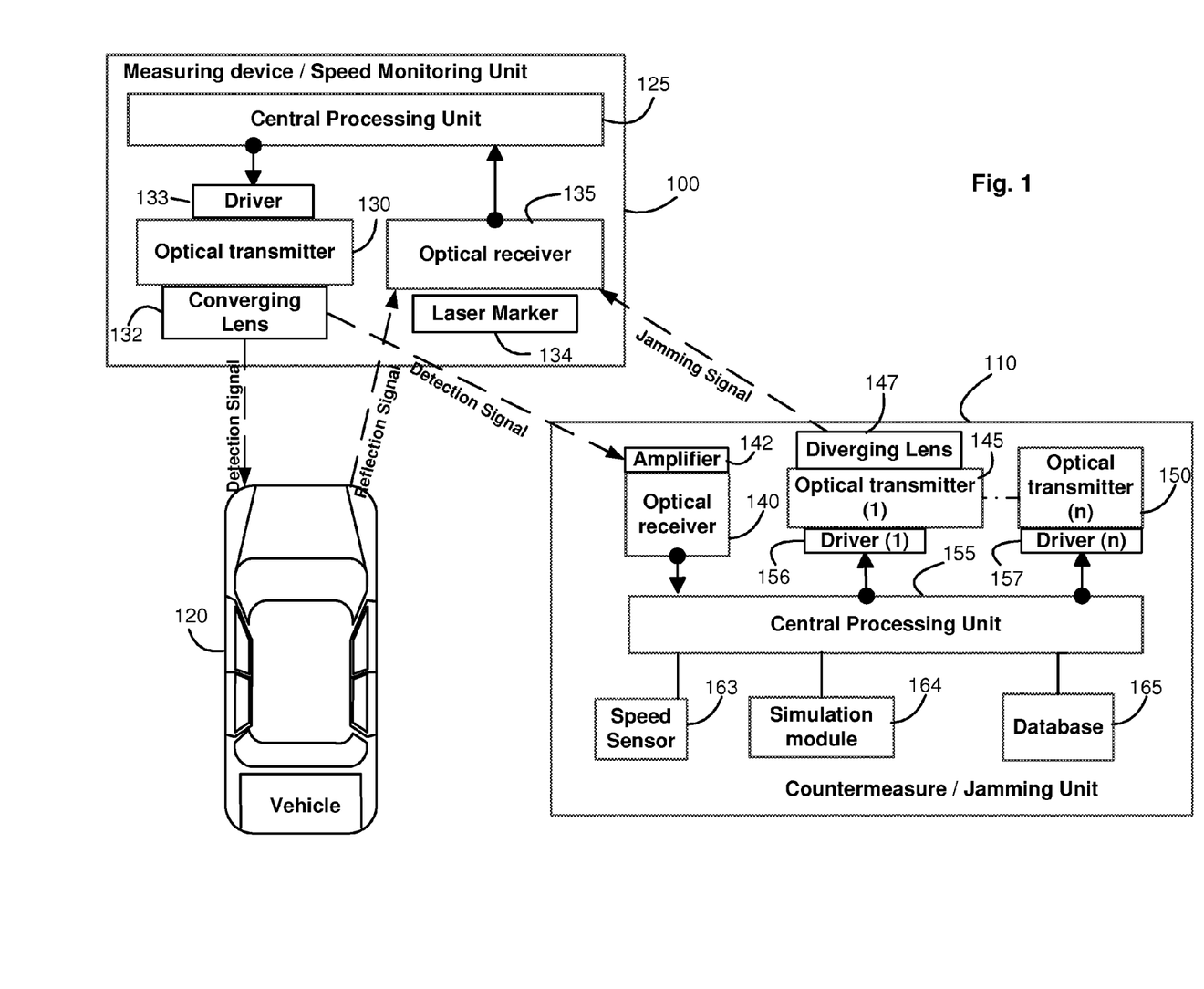
FIG. 1 is a schematic drawing of the system components according to the present invention.

According to embodiments of the present invention, and as depicted in FIG. 1, the measuring device 100 comprises a software controlled driver 133 of the optical transmitter 130, such as, for example, IXYS COLORADO MODEL PCO 7120 http://ixapps.ixys.com/DataSheet/pco-7120_data_sheet.pdf, to generate a detection signal with unpredictable dimensions. The software controlled driver 130 can control the dimensions of the detection signal namely, the amplitude, phase and shape of the signal. The measuring device 100 additionally comprises a CPU or DSP 125, and an optical receiver 135.

The measuring device 100 may additionally comprise a converging lens 132, to focus the detection signals on the measured vehicle and a laser marker 134 to be aimed at the target vehicle.

Measuring devices can be programmed to ignore or identify as jamming signals having amplitudes that are different, higher or lower, than the expected return signal amplitude.

Measuring devices can be programmed to ignore or identify as jamming signals having signal widths that are different, shorter or longer, than the expected return signal width.]

Measuring devices can be programmed to ignore or identify as jamming signals having signal shapes that are different than the expected return signal shape.

The measuring device may have a database of signals and their expected return signals.

In case the measuring device ignores certain reflected pulse amplitude, the countermeasure transponder may take advantage of this fact and mask the true signal with a so-called jamming amplitude, and heighten its pulse amplitude accordingly. For every pulse received by the countermeasure transponder, two pulses will be sent back: a first pulse having the same amplitude of the received pulse and reflecting the fictitious speed we wish to be measured and a second higher amplitude pulse to be received by the measuring device at the time it expects the reflected pulse to arrive, effectively masking the reflective signal. The measuring device will ignore this masked pulse due to its amplitude.

In case the measuring device ignores certain reflected pulse widths, the countermeasure transponder may take advantage of that fact, and mask the true signal with a so-called jamming width, and widen its pulse. For every pulse received by the countermeasure transponder, two pulses will be sent back: a first pulse having the width of the received pulse and reflecting the fictitious speed we wish to be measured and a second wider pulse to be received by the measuring device at the time it expects the reflected pulse to arrive. The measuring device will ignore this pulse due to its width.

In case the measuring device ignores certain reflected pulse shapes, the countermeasure transponder may take advantage of that fact and mask the true signal with a so-called jamming shape. For every pulse received by the countermeasure transponder, two pulses will be sent back: a first pulse having the same shape as that of the received pulse and reflecting the fictitious speed we wish to be measured and a second incorrectly shaped pulse to be received by the measuring device at the time it expects the reflected pulse to arrive, effectively masking the reflective signal. The measuring device will ignore this masked pulse due to its incorrect shape.

According to embodiments of the present invention, the measuring device is capable of transmitting a random sequence of measure signals with no repeating or predefined pattern. The measuring device uses a truly-random algorithm, such as an embedded true random number generator for FPGAs http://www.google.com/url?sa=t&rct=j&q=random%20algorithm%20embedded&source=web&cd=3&ved=0CDsQFjAC&url=http%3A%2F%2Fciteseerx.ist.psu.edu%2Fviewdoc%2Fdownload%3Fdoi%3D10.1.1.86.2324%26rep%3Drep%26type%3Dpdf&ei=TuqqTt28BIqRswabr7HzDw&usg=AFQjCNEWYMCBvR1zeDnKy2Tf3E_Ha5-6jA or a pseudorandom number generator (http://en.wikipedia.org/wiki/Pseudorandom_number_generator) that cannot be predicted in real-time by any system. The measuring device uses the random number generator to determine the detection signal's dimensions including: the height, which represents the signal amplitude strength; the width, which represents the signal phase duration; the pulse repetition period (PRP) representing the frequency of pulses; and the shape of the pulse, which represents the function (e.g. pulse waves, square waves, boxcar functions, rectangular functions, Nyquist and Gaussian).

Figure 4:
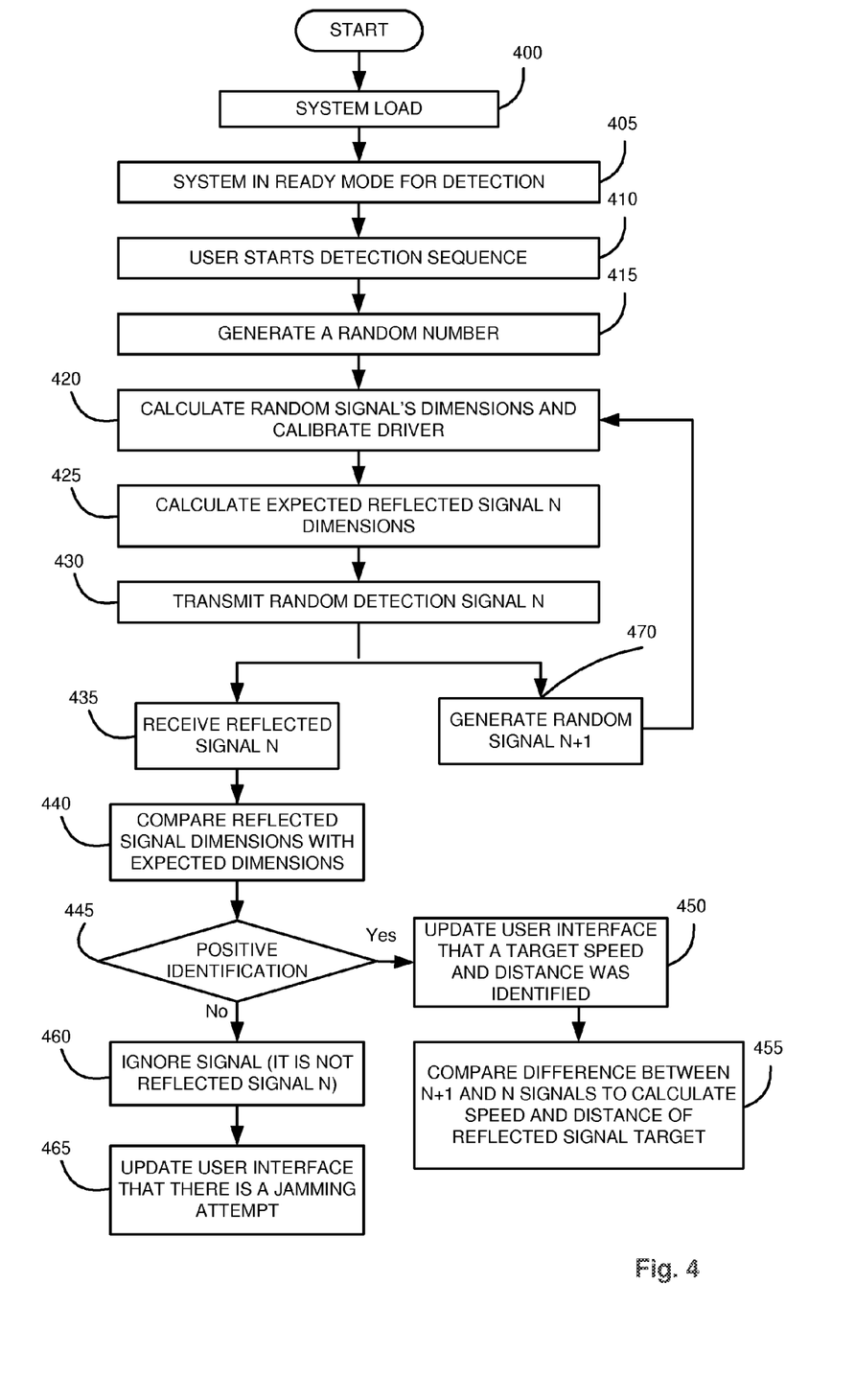
FIG. 4 is a flowchart detailing the steps taken by the measuring device according to method of the present invention.

According to embodiments of the current invention, as shown in the flowchart of FIG. 4, the measuring device starts the detection sequence when the user initiates a detection sequence (step 410), for example by pressing a button on the measuring device. The measuring device uses a random number generator to generate a random number or numbers (step 415). The random number or numbers are used to define the dimensions of the next outgoing detection signal. The measuring device calculates the random signal's dimensions and calibrates the driver accordingly (step 420). In step 425 the measuring device calculates the expected reflected signal's dimensions. The measuring device transmits the signal (step 430). The reflected signal will return (step 435) and be compared with the expected reflected signal (steps 440, 445) to validate that it is not a jamming signal. If the reflected signal is identified as a jamming signal, it is ignored by the measuring device (step 460) and/or declared as a jamming signal (step 465). Otherwise, an identification of a target speed and distance is declared (step 450) and the measuring device compares every two consecutive reflective signals (step 455), to calculate the speed and distance of the target.

After the random detection signal n has been transmitted (step 430), the measuring device generates the next random signal n+1 (step 470) and returns to step 420 to calculate the random signal's dimensions and calibrate the driver.

Because the next signal dimensions are random, no countermeasure device can predict the dimensions of the next signal and prepare a simulated signal to jam the measuring device. A countermeasure device that sends a jamming signal, will not have the dimensions the measuring device expects for the signal n. Because the signal n is random, the countermeasure device cannot simulate the reflected signal with a jamming signal in an effective time. The reflected signal cannot be simulated in time because the time for generating the simulated jamming signal comprises of the detection time t+analysis of the detection signal+calculating the expected signal+preparing the countermeasure driver for sending the simulated jamming signal dimensions+sending the jamming signal. In real-world scenario the reflected signal would always be received by the measuring device before the jamming signal. The measuring device would ignore any signals that have the expected dimensions, after the first signal with expected dimensions would be received. As such, any simulated jamming signals would be ignored from the measuring device's speed and distance calculation, and the user would be notified that a countermeasure attempted to jam the signal and failed.

The invention claimed is:

1. A pulse transponder countermeasure device, comprising:
a central processing unit (CPU);
an optical receiver connected with said CPU, said optical receiver adapted to receive detection signals from a speed measuring device;
at least one optical transmitter connected with said CPU, said at least one optical transmitter adapted to transmit jamming signals to said speed measuring device; and
a speed sensor unit adapted to measure a vehicle's speed, said CPU configured to use said vehicle's speed to calculate a response time for sending a jamming signal to said speed measuring device.

2. The device of claim 1, said CPU further configured to quantify at least one of said detected signal's dimensions and send a jamming signal that simulates a reflected signal.

3. The device of claim 2, wherein said transmitter is configured to control at least one of said jamming signal's amplitude, width and shape.

4. The device of claim 1, further comprising memory connected with said CPU, said memory storing a database of measuring devices signature signals.

5. The device of claim 4, wherein said database additionally stores measuring devices reflective signals.

6. The device of claim 4, wherein said CPU is configured to identify said speed measuring device in said database according to said received detection signal's signature.

7. The device of claim 1, further comprising means for recording said detection signals.

8. A method of jamming a speed and/or distance detection signal, comprising:
receiving from a speed measurement device a detection signal directed at a vehicle;
measuring said vehicle's speed;
using said measured speed to calculate a response time for sending a jamming signal to said speed measuring device so as to change the speed and/or distance perceived by said speed measurement device; and
sending a signal toward said speed measurement device at said calculated time.

9. A method of jamming a speed and/or distance detection signal, comprising:
receiving from a speed measurement device a detection signal directed at a vehicle, said detection signal having a signature and a reflected signal pattern;
analyzing said signature to identify said speed measurement device in a database comprising speed measurement devices signatures;
calculating a jamming signal;
measuring said vehicle's speed;
using said measured speed to calculate a response time for sending said jamming signal; and
transmitting said jamming signal to said speed measurement device at said calculated time.

10. The method of claim 9, wherein said analyzing comprises using a statistical probability algorithm to find a closest match to said signature in said database.

11. The method of claim 10, wherein if the difference between said closest match and said signature is greater than a predefined threshold, a new entry is created in said database for said signature.

12. The method of claim 9, wherein said transmitting a jamming signal comprises controlling at least one of said jamming signal's amplitude, phase and shape using software control.

13. The method of claim 9, wherein said transmitting a jamming signal comprises changing the speed and/or distance perceived by said measurement device.

14. The method of claim 9, wherein said detection signals comprise a predefined sequence of signals transmitted in a cyclic pattern and wherein said database comprises a complete list of signatures for said cyclic pattern.

15. The method of claim 9, wherein said steps of receiving, analyzing, calculating and transmitting are done simultaneously for at least two speed measurement devices.

16. The method of claim 9, wherein said transmitting comprises:
  transmitting at least one signal having one dimension similar to said reflected signal and slightly different remaining dimensions; and
  transmitting a jamming signal wherein said one dimension is slightly different from said one dimension in said reflected signal.

17. The method of claim 16, wherein said one dimension is selected from the group consisting of: signal amplitude, signal width, signal PRP and signal shape.

18. The method of claim 9, additionally comprising adding a database entry for said speed measurement device, comprising said received signal's signature, if said signature is not found in said database.

19. A pulse transponder measuring device, comprising:
  a central processing unit (CPU);
  an optical transmitter connected with said CPU, said optical transmitter adapted to transmit detection signals to a measured vehicle; and
  an optical receiver connected with said CPU, said optical receiver adapted to receive reflected signals from said measured vehicle;
  said transmitter configured to control at least one of said transmitted signal's dimensions.

20. A pulse transponder measuring device, comprising:
  a central processing unit (CPU);
  an optical transmitter connected with said CPU, said optical transmitter adapted to transmit detection signals to a measured vehicle; and
  an optical receiver connected with said CPU, said optical receiver adapted to receive reflected signals from said measured vehicle;
  said CPU configured to detect at least one of said reflected signal's pulse repetition period (PRP), amplitude, width and shape.

21. A method of measuring a vehicle's speed, comprising:
  generating at least one first random number;
  calculating a first detection signal by assigning said at least one first random number to at least one dimension of said calculated first detection signal;
  transmitting said calculated first detection signal towards a vehicle.

\* \* \* \* \*